Aug. 17, 1948.    M. A. MORRILL    2,447,354
ROTARY SIDE DELIVERY RAKE
Filed July 8, 1946    4 Sheets-Sheet 3

MELVIN A MORRILL
INVENTOR.

ATTORNEYS

Aug. 17, 1948.  M. A. MORRILL  2,447,354
ROTARY SIDE DELIVERY RAKE
Filed July 8, 1946   4 Sheets-Sheet 4

MELVIN A. MORRILL
*INVENTOR.*

BY *Huebner, Maltby & Beehler*

ATTORNEYS

Patented Aug. 17, 1948

2,447,354

UNITED STATES PATENT OFFICE 2,447,354

ROTARY SIDE DELIVERY RAKE

Melvin A. Morrill, Laton, Calif.

Application July 8, 1946, Serial No. 682,002

23 Claims. (Cl. 56—377)

1

This invention relates to agricultural implements and more particularly to side delivery rakes. The present invention is further adapted for use as a cultivator and is advantageously employed as such for the combing of weeds and roots from the soil, as in the preparation of plowed sod for planting. It will be obvious as the description progresses that certain features of the invention have their greatest utility in raking operations, but it will also be observed that the same machine or parts thereof may be employed for cultivating and combing operations. For convenience in description, I will first describe the machine in connection with the raking of hay.

Conventional side delivery hay rakes are not able to adapt themselves to uneven terrain. As a result, hay is lost because it is not gathered efficiently and damage to the hay rake occurs when its rigid construction is subjected to the various stresses imposed thereon by movement over uneven ground. Conventional rakes tangle and shatter the hay as it is rolled to the side. Said rakes are slow in operation, are capable of being turned only one direction while operating, and are only slowly and tediously transported from place to place. Further, their many gears, sprockets, driving chains, and other moving and intermeshing parts have provided many points of wear and sources of maladjustment.

Objects of my present invention are, therefore, to provide an improved side delivery hay rake adapted to adjust itself to uneven terrain over which it is operated.

Another object is to provide an apparatus for raking hay into rows with a minimum of tangling and shattering of the hay.

Another object is to provide an apparatus conducive to the speedy and efficient raking of hay.

Another object is to provide a side delivery hay rake that may be turned either way during operation.

Another object is to provide a conveniently transportable rake.

Another object is to reduce wear and maladjustment incident to the many moving and intermeshing parts in conventional side delivery hay rakes.

Another object is to provide ground driving means for side delivery hay rakes.

Another object is to eliminate the necessity frequently encountered in conventional hay rakes for turning inside irrigation basins to avoid checks, ridges and the like.

Another object is to reduce friction and other

2 impeding influences encountered in the operation of conventional hay rakes.

A further object is to provide a combination hay rake and cultivator adapted to comb roots, trash and the like from soil.

Further objects are to provide a rugged, efficient, and economical combined hay rake and cultivator and to provide improved elements and arrangements thereof in a device of the character and for the purposes set forth.

Other objects and advantages will appear from the further description in the specifications.

In the drawings:

Fig. 2 is a side elevation of the rake showing one raking wheel elevated as for traversing irrigation dikes and the like.

Figure 1:
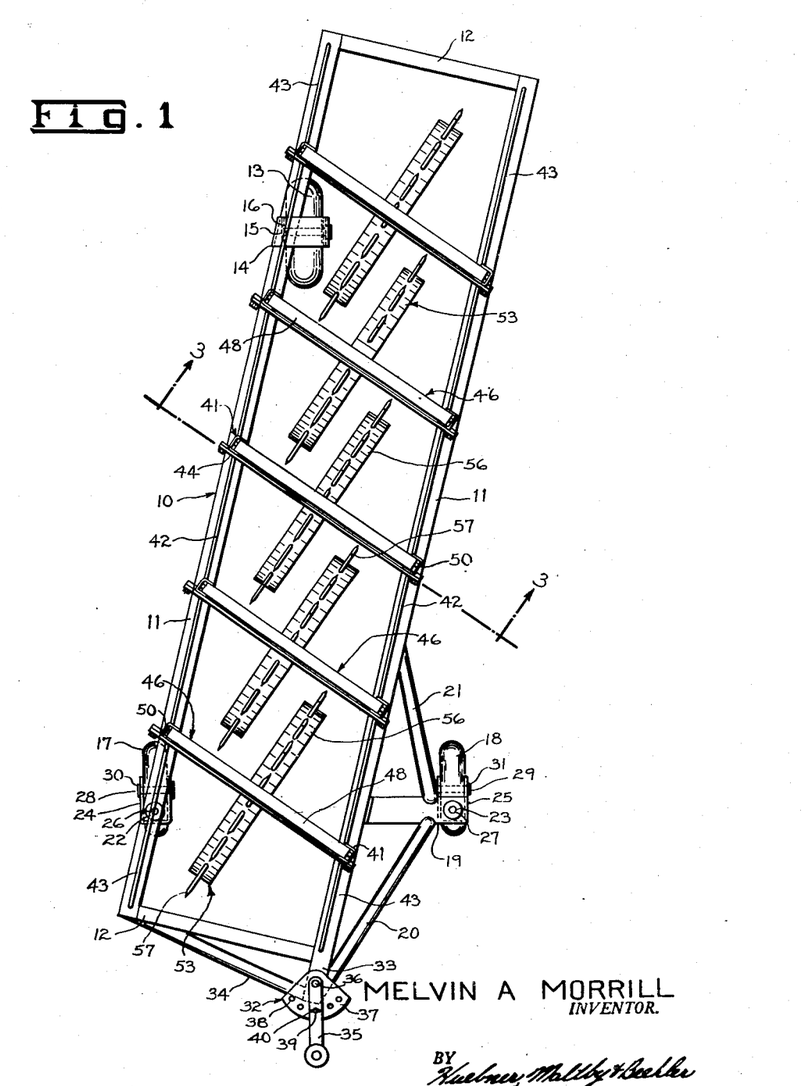
Fig. 1 is a horizontal plan view of a side delivery hay rake embodying the principles of the present invention.

Referring more in detail to the drawings:

In Fig. 1, a rectangular support frame of rigid construction is indicated generally at 10 comprising longitudinal members 11, transverse end members 12 and other elements presently more fully described. Said longitudinal members, since they bear the main strains incident to the operation of the hay rake, are preferably fabricated from strong and rigid, but relatively light-weight material, such as box-beam iron weldably connected.

The rear portion of the frame 10 is supported by a fixed rear wheel 13 rotatably mounted below said frame by a depending yoke 14 secured to the underside of said frame, an axle 15 and bearings 16. The wheel 13 is an illustration by way of example only and not of limitation of a direction determining or directional control means. It is in the nature of a keel or fixed or fixable rudder. The same directional control function could be accomplished by a skid, shoe or other equivalent device, either ground engaging or tractor actuated.

The forward portion of the frame 10 is supported by swivel wheels 17 and 18, respectively. It being desirable to furnish the frame with support laterally offset therefrom to avoid overturning the rake, the wheel 18 is provided with a mounting bracket 19, outwardly extended from the frame, and a forward strut 20 and a rearward strut 21 for bracing the same. Swivel bearings are provided in a substantially erect position in the frame at 22 and in the outer end of the bracket at 23. Wheel yokes 24 and 25 are swivelly mounted below the bearings 22 and 23 by shafts 26 and 27. The yokes are directed rearwardly at their lower end portions to cause the wheels 17 and 18 to operate as castors in providing frame support. Said wheels are rotatably mounted in the lower end portions of the yokes by means of axles 28 and 29 and bearings 30 and 31, respectively.

Attention is directed to the three point support provided by the wheels 13, 17, and 18. The fixed rear wheel 13 is preferably mounted so its plane of rotation coincides with the direction of movement of the rake during normal operation. The forward swivel wheels 17 and 18 are laterally spaced, to resist upsetting of the rake on turns, substantially equal distances from an imaginary line passed through the rear wheel and coincident with the direction of movement of the rake during normal operation. The three point support described, including the fixed rear wheel 13, illustrates by way of example only and not of limitation a means attached to the frame supporting the frame for ground traversing operation and maintaining the frame in a substantially constant attitude relative to the ground traversed. It is obvious that skids, shoes, or other equivalent devices could be substituted for the wheels or that an equivalent support and directional control might be obtained by a suitable connection to a tractor in substitution in whole or in part for the ground engaging wheels.

A draft means is indicated generally at 32 comprising an extension 33 of the longitudinal member most nearly centered at the front of the rake, a bracing strut 34, the forward strut 20 already referred to, a draw bar 35 and a pivot pin 36, mounting said draw bar to swing in a horizontal plane at the intersection of the struts 20 and 34 and extension 33. To lock the draw bar 35 in adjusted pulling position an arcuate locking plate 37 is secured to the rake framework near the pivot point of the draw bar. A plurality of receptacles 38 are formed through the locking plate 37 and an opening 39 is formed in the draw bar. To engage opening 39 and receptacle 38 and secure the draw bar in adjusted position, a pin 40 is inserted through said opening and into a juxtaposed receptacle. The draft means described is only one of several that may be advantageously employed to permit the application of a traction force at adjusted angles or freely pivoting, as desired.

It has been discovered to be advantageous to provide in hay rakes a plurality of floating raking means individually elevated or depressed in response to an uneven terrain over which it may be drawn. To this end substantially erect guide ways are formed for the directing of such elevating and depressing of the raking means presently more fully described. Channel iron posts 41 are weldably secured to the longitudinal members 11 in substantially vertical positions with the flanges of the channel iron inwardly disposed. Said posts are arranged in pairs, each of the posts on the right hand longitudinal member being preferably positioned relatively rearward from its respective post on the left longitudinal member. This staggering of the posts is clearly illustrated in Figures 2 and 3. To impart greater strength to the support frame 10 and to brace the posts, said posts mounted on each longitudinal member are joined by tie rods 42 near their upper extremities. The end posts are reinforced by tie rods 34 secured to said upper extremities of the posts 41 and their respective end portions of the longitudinal members 11. The posts are further braced by cross pieces 44 removably secured between the upper end portions of pairs of cooperatively employed posts, as by bolts 45. The cross pieces are removable to permit insertion and removal of guides and raking means presently more fully described.

Figure 2:
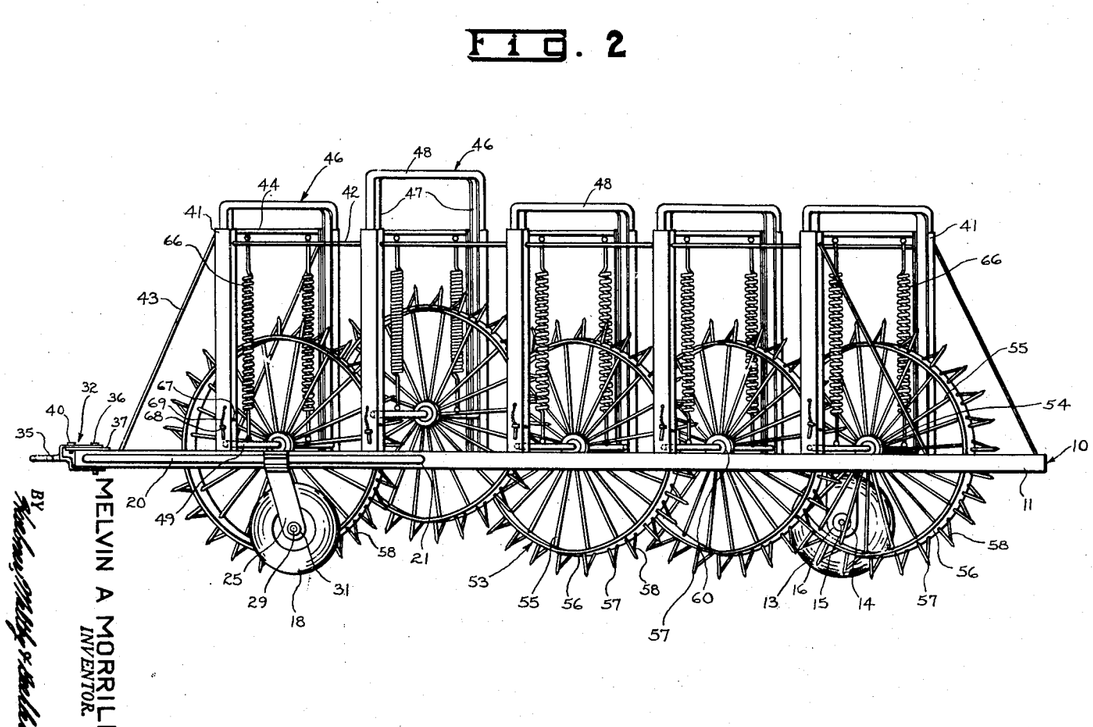
Figures 3, 4:
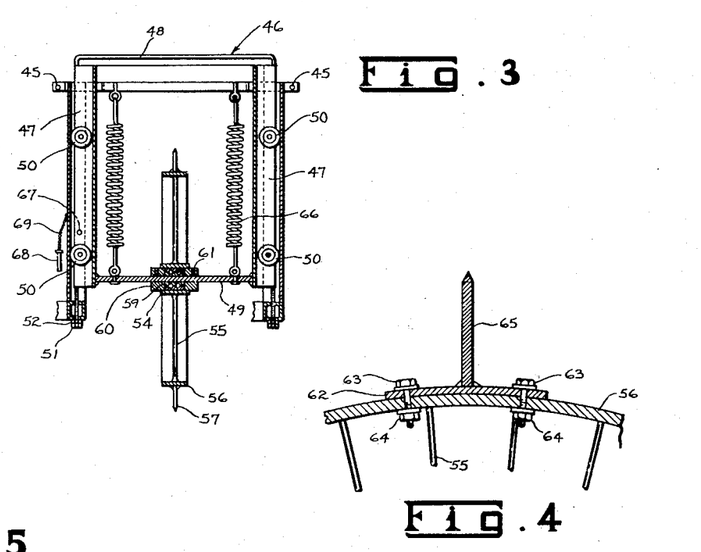
Fig. 3 is a fragmentary section taken on line 3—3 of Fig. 1.
Fig. 4 is a sectional view of a modified securing means for raking and cultivating teeth of the present invention.

In Fig. 1, Fig. 2, and in greater detail in Fig. 3, the numeral 46 indicates a guide in guide way engagement. Each guide comprises a pair of parallel, upright elements 47, a top brace 48, and an axle 49 for mounting its respective raking means. The upright elements, brace, and axle are preferably joined in rigid rectangular relation. Said upright elements are conveniently constructed of channel iron, the open face thereof being disposed inwardly relative to the guide ways in the posts 41. To reduce friction between the guides and guide ways, rollers 50 are rotatably mounted within the channels of the upright elements 47 in engagement with the inner surface of the web of the channel iron posts 41. So mounted the guides move freely within the guide ways but are constrained to substantially vertical paths of movement. It is further to be noted that the axle 49 is at all times maintained in a horizontal attitude by the guide 46 and in a constant angular relation to the support frame 10 by the guide ways.

Adjustment bolts 51 are screw threadably engaged in the longitudinal members 11 of the support frame in positions extending upwardly within the posts 41 to contact guides 46 whereby the lower limit to which each guide is permitted to descend may be regulated by rotating the bolts to raise or to lower them. Each bolt is provided with a jam nut 52 to secure it in adjusted position.

Raking means 53 are rotatably mounted on the axles 49. The raking means comprise wheels, preferably of rugged construction, having hubs 54, spokes 55, and rims 56. Radially extended from the rims, and weldably secured thereto, are raking spikes or teeth 57. Braces 58 are provided for the teeth, not only to assist in the raking operation but to strengthen the teeth for the previously discussed cultivating and soil combing operations. Roller or ball bearings 59 are advantageously employed to mount the raking means in a manner minimizing operational friction. Collars 60 are provided on the axles in abutting relation to each side of bearings 59 and serve to maintain the raking means 53 laterally positioned on their respective axles. The collars are secured in place by stud bolts 61.

When the rake of the present invention is used on rocky land or other area subjecting the teeth to excessive strains during operation, convenient removal and substitution of teeth is desirable. To this end a modified mounting for the teeth is illustrated in Fig. 4. A securing plate 62 is formed to have a curvature in substantial conformity to the periphery of the raking wheels 53. Congruent openings are drilled in the securing plates and through the rims of the wheels. Screw threaded bolts 63 and nuts 64 are engaged in said openings and secure the plate in operating position. Teeth 65, similar to teeth 57 are weldably mounted on the securing plates in substantially radial relation to the raking wheels. Although Fig. 4 indicates a single tooth so mounted on a plate, it is to be understood that any desired number of teeth may be so mounted on each plate.

Referring again to Fig. 1, the relative positioning of the raking means 53 is clearly indicated. Said means overlap to assure full raking coverage of the terrain traversed by the rake. The relative positioning preferably provides the raking means in echelon relation, each raking means having a plane of rotation substantially vertical, said plane of rotation being parallel to the plane of rotation of each other raking means, and all planes being angularly displaced from the direction of movement of the rake during normal operation.

Helical tension springs 66 are secured to the cross pieces 44 and the axles 49 of a strength to materially reduce the weight of the raking means 53 and guides 45 permitted to be borne by the teeth 57 and the rims 55. The tensions of the springs are altered in response to the use, type of soil encountered, quantity of hay engaged, and other variable factors influencing the operation of the apparatus.

As described, during raking operations the greater part of the weight of the raking means 53 and guides 46 is borne by the springs 66. Thus, the raking means may be raised manually with little effort. To secure the raking means in elevated position, openings 67 are provided in the upright posts 41. Keys 68 are provided to engage said openings. The keys are conveniently supported near the openings 67, when not in use, by chains 69. When it is desired to transport the rake, the raking means 53 are manually elevated safely removed from possible ground engagement and secured thereby by inserting the keys 68 into the openings 67. Thus inserted, the keys provide rests for the guides 46 and supported raking means during transportation of the rake.

*Raking wheel mounting modification*

Figure 5:
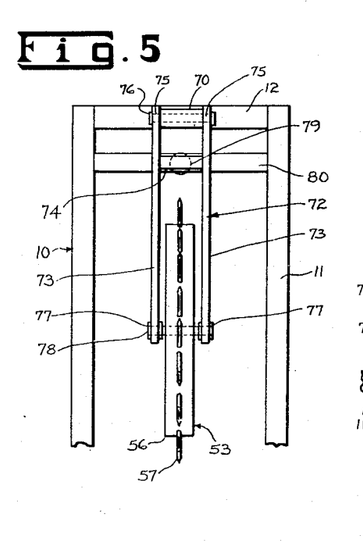
Fig. 5 is a horizontal plan view of a raking wheel and modified mounting therefor.
Figure 6:
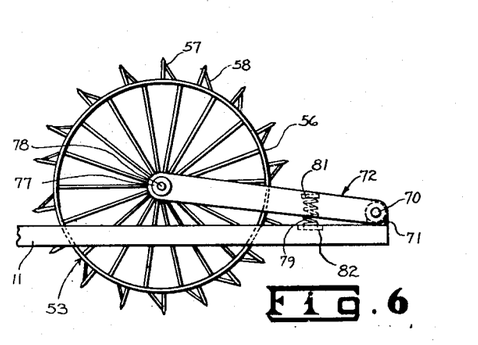
Fig. 6 is a side elevation of a raking wheel and the modified mounting as shown in Fig. 5.

Other means for floatably mounting the raking wheels have been found satisfactory. Figs. 5 and 6 illustrate one such modified mounting.

The longitudinal members 11 and transverse end members 12 of the supporting frame 10 as well as the previously described raking means 53 are again indicated in Figs. 5 and 6. The modified mounting is indicated as being borne by the transverse member 12. It is to be understood that the raking means rearward of the front raking means cannot conveniently be mounted on the front transverse member 12. For such mounting other transverse members are required similar to members 12 but necessarily supported at only one end to permit the raking means to overlap as previously described.

A bearing 70 is mounted on the transverse member 12 by a pillow block 71. A raking wheel yoke 72, comprising legs 73, cross brace 74, and pivot bearings 75, is pivotally mounted on the transverse member 12 by means of a thrust shaft 76 inserted in bearing 70 and pivot bearings 75. So articulated to the support frame, the yoke is free to swing in a substantially vertical plane.

Aligned bearing openings 77 are provided transversely in the free end portions of the legs 73. An axle 78 is employed to mount the raking means in the yokes 72 by engaging the openings 77. The raking means are maintained in proper position on the axle by means of collars 60 and stud bolts 61, as previously described and shown.

The weight of the raking means 53 and yoke 72 permitted to be borne by direct ground engagement is limited, in the present modification, by a compression spring 79. A transverse member 80 is provided between the longitudinal members 11 below the yoke brace 74. Juxtaposed spring receptacles 81 and 82 in the yoke brace 74 and transverse member 80, respectively receive the compression spring and maintain it in operational position.

To elevate the raking means for transporting the rake, said raking means are manually elevated and any suitable block, not shown, is inserted between the transverse member 80 and the yoke brace 74.

The modified mounting for the raking means and the preferred mounting means may be used separately or in combination. It has been found convenient to mount the forward raking wheel by the modified means and the raking wheels rearward thereof by the preferred means.

*Raking teeth modification*

In the raking of hay, resilient raking teeth have been found to be conducive to increased raking efficiency. Their retarded movement at their outer end portions due to the drag exercised thereon by the hay and/or ground engagement results in a sweeping action and a flicking release of the hay, efficaciously gathering and positioning the same.

Figure 7:
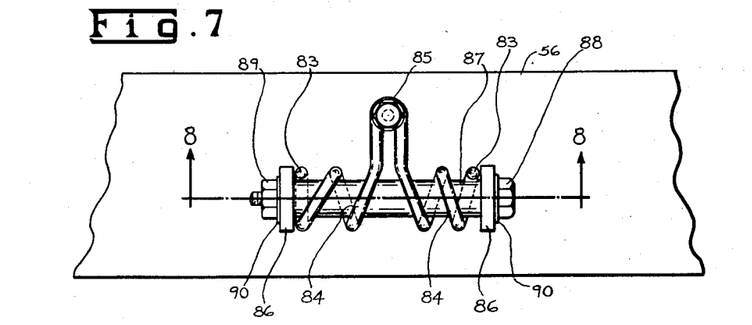
Fig. 7 is a plan view of a pair of modified raking teeth and a resilient mounting therefor secured to the periphery of a raking wheel.
Figures 8, 9:
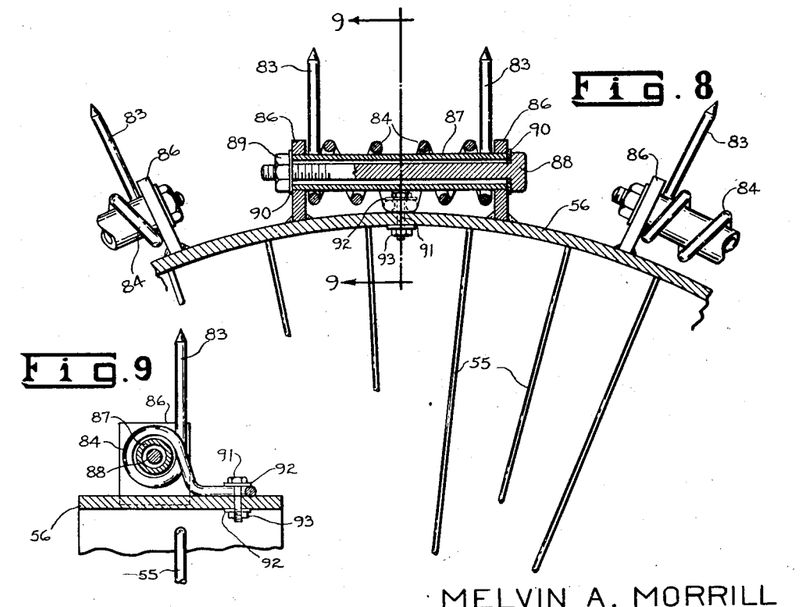
Fig. 8 is a sectional view taken on line 8—8 of Fig. 7.
Fig. 9 is a transverse fragmentary section taken on line 9—9 of Fig. 8.

In Figs. 7, 8, and 9 such teeth 83 are shown. Preferably the resilient teeth are formed in pairs comprising the ends of a rod of spring steel. The rod is shaped to form helical spring portions 84 adjacent each tooth and to have an anchor portion 85 between the spring portions. The spring portions and anchor portion are formed to bear a substantially tangential relation to the peripheries of the raking wheels while the teeth are outwardly extended therefrom.

To mount the teeth, substantially parallel brackets are secured to the periphery of the raking wheels, as by welding. Aligned openings are formed in each bracket. A hollow cylindrical support element 87 is inserted through one of said openings, through the spring portions 84 and through the other of the said openings. By employing support elements of a size closly approximating the radius of the helical portions, the teeth may be flexed in one direction but not in the direction opposite thereto because of binding on the support element. The teeth are mounted so as to be resilient to drag imposed thereon by forward operation of the rake.

A bolt 88 is passed through the hollow longitudinal interior of the support element and secures the teeth, spring portions, and support element in place by means of a nut 89 and washers 90. A second bolt 91, washers 92, and nut 93 are employed to clamp the anchor portion 85 to the periphery of the raking wheel 53. It is to be observed in Fig. 9, that the resilient teeth 83 are substantially centered on the raking wheel, the spring portions 84 being forward thereof relative to the direction of movement of the present hay rake and the anchor portion 85 rearward of the center of said wheels.

It is further to be understood that the resilient raking teeth may be constructed so as to be removable and replaceable by welding the brackets to securing plates similar to securing plate 62 in Fig. 4 already described.

Operation

The operation of a combined hay rake and cultivator constructed as described is as follows:

A prime mover, such as a tractor, is connected to the draw bar 35. The draw bar may be permitted to swing freely or may be locked in angular relation to the rake by inserting pin 40 into opening 39 and selected receptacle 38, as desired.

For hay raking operations, the adjusting bolts are positioned to limit the downward movement of the raking means in response to the thickness of the hay to be encountered and unevenness of terrain. Preferably, the teeth 57, 65 and 83 should merely skim the top of the ground when raking.

As the rake is caused to traverse a field of mowed hay, the raking means 53 rise and fall individually in response to terrain encountered. The bulk of the weight of the raking means and guide 53 or yoke 72, being borne by the springs 66 and 79, respectively, said raking means riding over irrigation dikes, checks and the like without causing the teeth to dig in beyond a preadjusted limit conducive to raking efficiency.

During normal operation, the direction of movement of the rake is substantially as indicated by the positions of the wheels in Fig. 1. As the teeth 57, 65, or 83 encounter hay and/or the ground, the raking means 53 are caused to rotate by the drag imposed on the teeth. Because of the angular relationship existing between the planes of rotation of the raking means and the direction of movement of the rake, each tooth has a component of movement toward the side of the rake during hay engagement. The pattern traced on the ground by each tooth while in ground and/or hay engagement is substantially a straight line at right angles to the direction of movement of the rake. Thus, each raking means rakes the encountered hay to the side, where it, in turn, is encountered and continued to the side by each successive rearward raking means. The raking action is essentially a straight drawing of the hay to the side without rolling the same. This minimum disturbance of the hay during movement greatly reduces present known tangling and shattering incident to conventional side delivery rakes.

When the modified raking teeth 83 are employed their resilience not only protects them from damage but their sweeping action and flicking release of the raked hay provide greater raking efficiency.

To employ the rake as a cultivator, the adjustment bolts 51 are lowered in response to the depth to which it is desired to have the teeth disturb the ground. The spring 66 and 79 may be left in operating position if the soil to be cultivated is soft, or removed when it is desired to impose greater weight on the teeth. Not only does the present apparatus provide efficient cultivating but the continuing raking movement of the teeth plus their upward movement as they rotate from the soil comb roots and other foreign materials from the soil and deposit them at the side of the rake. As previously mentioned, this function of the present invention is particularly valuably employed for cultivating and combing sod that has been plowed.

The swivel mounting of the forward wheels 17 and 18 permit the combined rake and cultivator to turn in either direction while in operation. The tendency to tip when turning to the left is overcome by the extended mounting of the wheel 18 from the support frame 10. Even though the wheel 18 is extended, it will be noted that the ground traversed thereby is also subsequently traversed by the rear raking means 53 in performing its raking or cultivating operations.

To transport the combined rake and cultivator, the raking means 53 are secured in elevated position by locking the guides 45 of the preferred embodiment in an elevated position or blocking up the yoke 72 of the modified mounting as described. The raking means being so supported above possible ground engagement, the rake is speedily, conveniently, and quietly transported from place to place.

The present invention provides a tractable, rugged, efficient, mobile, ground driven combined hay rake and cultivator with a material reduction in moving parts subject to wear and maladjustment, a rake providing a minimum of resistance to forward movement during operation and conducive to the speedy raking of hay.

Although I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent devices and systems.

Having described my invention, what I claim is new and desire to secure by Letters Patent is:

1. In a side delivery rake having a forwardly movable draft frame having a direction control means operably associated therewith, a plurality of rotary raking means arranged in echelon in substantially parallel, erect planes angularly displaced from the normal direction of movement of the frame, and mounting means borne by the frame and individually mounting the raking means for floating movement in their respective planes in response to depressions and elevations in terrain traversed.

2. In a side delivery hay rake having a forwardly movable draft frame having a direction control means operably associated therewith, a plurality of rotary raking wheels arranged in echelon in substantially erect, parallel planes angularly related to the normal direction of movement of the frame, the rearward portion of each rotary raking wheel except the rearwardmost of said wheels overlapping the forward portion of its rearwardly adjacent raking wheel, means borne by the frame mounting the raking wheels for rotation in their respective planes and for individual elevational movement, and resilient means individually connected to the mounting means and resistive to weight imposed thereon whereby the raking wheels lightly engage terrain over which the rake is drawn and independently rise and fall in response to depressions and elevations in the terrain traversed.

3. In a side delivery hay rake having a forwardly movable draft frame and a direction control means operably associated therewith, a plurality of substantially uniform rotary raking wheels arranged in echelon in substantially parallel planes angularly related to the normal direction of movement of the frame, each of said wheels including a substantially cylindrical rim concentrically disposed the wheel adapted to ride over encountered hay and the like and slightly to compress the same downwardly against the earth and outwardly extended raking teeth borne by the rim for hay engagement, the rearward portion of each rotary raking wheel except the rearwardmost of said wheels overlapping the forward portion of its rearwardly adjacent raking wheel a distance approximating the radius of said wheels, means borne by the frame mounting said raking wheels for rotation and independent elevational movement in their respective planes, and resilient means interconnecting the frame and the individual mounting means and urging the individual raking wheels upwardly with a force less than the weight of said wheel.

4. In a side delivery hay rake employing a forwardly movable draft frame bearing a ground engaging direction control means and means for effecting connection of the frame to a draft appliance, means for supporting the frame at three points for earth traversing movement so as to maintain the frame a predetermined spaced distance from the surface of the earth traversed and in substantially constant attitude relative thereto; a plurality of rotary raking means arranged in echelon in substantially parallel erect planes angularly displaced from the normal direction of movement of the frame and each of said raking means except the rearwardmost thereof forwardly overlapping its rearwardly adjacent raking means, and mounting means borne by the frame and individually mounting the raking means for floating movement in their respective planes in response to depressions and elevations in terrain traversed.

5. In a side delivery hay rake employing a draft frame having forward and rearward end portions and means for effecting connection of the frame to a draft appliance, laterally spaced swivel wheels in supporting relation to the forward end portion of the frame, a rear wheel in supporting relation to the rearward end portion of the frame constrained to a plane of rotation in substantial alignment with the normal direction of movement of the rake, rotary raking means arranged in echelon, and mounting means providing individual support for the raking means for floating movement in response to depressions and elevations in terrain traversed and constraining said raking means to substantially vertical positions in substantially parallel planes angularly related to the normal direction of movement of the rake.

6. In a side delivery hay rake having a draft frame bearing directional control means and means for effecting connection of the frame to a draft appliance for the imparting of earth traversing movement thereto, support means mounted on the frame and having guide ways formed therein in substantially erect position guides slidably engaged in the guide ways for reciprocal positioning, and rotary raking means borne by the guides in echelon arrangement for elevational reciprocal movement and constrained by the association of the guides in the guide ways to movement in substantially erect, parallel planes angularly related to the normal direction of movement of the rake.

7. In a side delivery hay rake having a forwardly movable draft frame and directional control means attached thereto; a plurality of support means borne by the frame and having pairs of spaced, cooperative guide ways formed therein; guides slideably engaged in the guide ways for elevational reciprocal positioning; substantially horizontal axles interconnecting pairs of the guides slideably engaged in the cooperative pairs of guide ways; rotary raking means mounted on the axles for elevational reciprocal movement by elevational reciprocal positioning of their respective guides and individually constrained by their respective axles, guides, and guide ways to positioning in substantially erect, parallel planes, angularly related to the normal direction of movement of the rake; and resilient means borne by the frame and individually connected to the rotary raking means in supporting relation thereto whereby said raking means are supported for individual floating movement in response to depressions and elevations in terrain traversed.

8. In a side delivery hay rake employing a forwardly movable draft frame and direction determining means attached thereto, a plurality of support frames borne by the draft frame and each having formed therein pairs of facing, substantially vertical guide ways; guides slideably engaged in the guide ways; axles individually interconnecting the guides mounted in the pairs of guide ways; rotary raking wheels mounted on the axles and constrained thereby to substantially erect positions, in echelon relation and obliquely disposed to the normal direction of movement of the rake; and adjustable resilient means individually interconnecting the support frames and their respective axles resistive to the weight of the guides and their respective raking wheels, whereby the raking wheels are rotated by hay and/or earth engagement when the rake is drawn over the ground and the individual raking wheels automatically and constantly adjusted to elevations and depressions in traversed terrain by floating movement of their respective guides in the guide ways.

9. In a side delivery hay rake having a forwardly movable draft frame and directional control means operably associated therewith; a plurality of rotary raking wheels arranged in substantially parallel planes angularly related to the normal direction of movement of the frame, said wheels including substantially cylindrical rims concentrically disposed the wheels adapted to ride over encountered hay and the like and slightly to compress the same downwardly against the earth and radially extended raking teeth borne by the rim, the rearward portion of each rotary raking wheel except the rearwardmost of said wheels overlapping the forward portion of its rearwardly adjacent raking wheel a distance approximating the radius of said wheels; support frames mounted on the draft frame adjacent the raking wheels and having pairs of facing, substantially erect guide ways formed therein oppositely disposed said wheels; guides slideably mounted in the guide ways for reciprocal elevational movement; axles interconnecting the guides mounted in the pairs of guide ways and constraining the guides of each pair thereof to corresponding elevational movement and individually mounting the raking wheels; tensioned resilient means individually interconnecting the axles and their respective support frames; means for adjusting the tension of the resilient means; and adjustable stops mounted in the support frames in positions abuttable with the guides whereby the lower limits of travel of said guides are adjustably predetermined.

10. In a side delivery hay rake having a forwardly movable draft frame having forward and rearward end portions and a rotary raking wheel, mounting means for the raking wheel comprising a pair of spaced legs pivotally mounted in the frame and rearwardly extended therefrom in angular relation to the normal direction of movement of the frame, an axle interconnecting the rearwardly extended end portions of the legs and mounting the rotary raking wheel in journaled relation thereon, and a helical compression spring interpositioned the frame and a point of the legs removed from the pivotal mounting thereof.

11. A side delivery rake comprising a mobile frame, means attached to said frame supporting the frame for ground traversing operation and maintaining the frame in a substantially constant attitude relative to the ground traversed, said means including directional control means, and a plurality of peripherally overlapping rotary raking means mounted on said frame in echelon arrangement and each rotatable in a plane at an angle to the direction of travel of said frame.

12. A side delivery rake comprising an elongated mobile frame having means at an end thereof adapted for connection to a prime mover, means attached to said frame supporting the frame for ground traversing operating and maintaining the frame in a substantially constant attitude relative to the ground traversed, said means including ground engaging, frame directional control means, and a plurality of peripherally overlapping rotary raking means mounted on said frame in echelon arrangement and each rotatable in a plane at an angle to the direction of travel of said frame.

13. A side delivery rake comprising a mobile frame having a draft connection thereon, means attached to said frame supporting the frame for ground traversing operation and maintaining the frame in a substantially constant attitude relative to the ground traversed, said means including ground engaging directional control means, and a plurality of rotary raking wheels mounted on said frame in echelon arrangement for rotation in substantially erect parallel planes in predetermined angular relation to the directional control means, adjacent raking wheels overlapping.

14. A side delivery rake comprising a mobile frame, means attached to said frame supporting the frame for ground traversing movement in predetermined attitude relative to earth traversed, said means including ground engaging, frame directional control means, a plurality of rotary raking wheels, and mounting means borne by the frame rotatably mounting the raking wheels for individual elevational movement in substantially vertical parallel planes at an angle to the normal direction of travel of the frame, adjacent raking wheels overlapping in echelon arrangement.

15. A side delivery rake comprising a mobile frame, means attached to the frame adapted for connection to a prime mover, support means operably associated with the frame including a ground engaging directional control means in spaced relation to the connection means and in alignment therewith, said means including directional control means, and a plurality of raking wheels rotatably mounted in the frame in echelon arrangement for rotation in substantially erect parallel planes angularly positioned relative to a line between the connecting means and the directional control means and having portion thereof disposed for engagement with rakable substance on the ground.

16. A side delivery rake comprising a mobile frame having a draft connection thereon, means attached to said frame supporting the frame for ground traversing operation, said means including ground engaging directional control means, a plurality of rotary raking wheels, individual mounting means borne by the frame and rotatably mounting the respective raking wheels for independent elevational movement in substantially erect parallel planes in predetermined angular relation to the directional control means, and resilient means operably associated with each individual mounting means and the frame resistive to the weight of the individual raking wheels imposed on their respective mounting means.

17. A side delivery rake comprising an elongated mobile frame having a forward and a rearward end portion, means attached to the frame adapted for connection to a prime mover, means attached to said frame supporting the frame for ground traversing operation and maintaining the frame in a substantially constant attitude relative to the ground traversed, said means including ground engaging directional control means, a plurality of rotary raking wheels arranged in substantially erect parallel planes in predetermined angular relation to the directional control means, the rearward peripheral portion of each rotary raking wheel except the rearwardmost of said wheels forwardly overlapping the forward peripheral portion of its rearwardly adjacent raking wheel, means borne by the frame individually mounting the raking wheels for elevational movement in their respective planes, and resilient members borne by the frame and individually associated with the wheel mounting means in supporting relation thereto.

18. A side delivery rake comprising a mobile frame, means attached to said frame supporting the frame for ground traversing operation and maintaining the frame in a substantially constant attitude relative to the ground traversed, said means including a rudder wheel fixedly mounted by the frame in ground engagement, and a plurality of rotary raking wheels mounted on said frame in echelon arrangement and each rotatable in a plane in predetermined angular relation to the rudder wheel.

19. A side delivery rake comprising an elongated mobile frame having a draft connection at one end, means attached to said frame supporting the frame for ground traversing movement, and maintaining said draft frame in substantially horizontal position, said means including ground engaging direction determining means, and a plurality of peripherally overlapping rotary raking means mounted on said frame in echelon arrangement and each rotatable in a plane at an angle to the direction of travel of said frame.

20. A side delivery rake comprising an elongated draft frame, ground traversing means connected to and supporting said frame, said means including at least one member engaging the ground and non-rotatably attached to the frame, a draft connection on said frame forwardly of said member, said member and said draft connection cooperating to maintain the frame in a line of travel substantially parallel to the line of travel of a tractive element coupled to the frame at said connection, and a plurality of rotary raking means rotatably mounted in echelon arrangement on said frame in substantially parallel planes at an angle to the line of movement of the frame, and adjacent raking means overlapping.

21. A side delivery rake comprising a mobile frame, means attached to said frame supporting the frame for ground traversing operation and maintaining the frame in a substantially constant attitude relative to the ground traversed, said means including a ground engaging rudder member mounted on the frame in fixed angular relation thereto, a plurality of rotary raking wheels, and means borne by the frame individually mounting the raking wheels in echelon arrangement for rotation in substantially erect parallel planes in predetermined angular relation to the rudder member and for individual elevational movement in their respective planes.

22. A side delivery rake comprising a mobile frame, means for connecting said frame to a prime mover, means attached to said frame supporting said frame for ground traversing movement, means on said frame resisting forces tending to shift said frame angularly from the line of travel of said prime mover, rotary raking means mounted on said frame in echelon arrangement, said raking means comprising wheels each including a flat treaded rim and teeth extending a fixed distance radially from said rim, and a hub and axle vertically shiftable relative to said frame, the axis of said hub and axle being disposed at an angle to the said line of travel, and a counter balance element operatively associated with the hub and axle partially reducing the effective weight of said wheel on ground encountered by said wheel.

23. A side delivery rake comprising a mobile frame, means attached to said frame supporting the frame for ground traversing operation and maintaining the frame in a substantially constant attitude relative to the ground traversed, said means including directional control means, and a plurality of peripherally overlapping freely rotatable raking wheels mounted on said frame in echelon arrangement with their peripheries normally in tangential proximity to but free of the ground traversed, and each raking wheel being rotatable in a plane at an angle to the direction of travel of said frame, said raking wheels being adapted to engage with a rakable substance on the ground.

MELVIN A. MORRILL.

REFERENCES CITED

The following references are of record in the file of this patent:

UNITED STATES PATENTS

| Number | Name | Date |
|---|---|---|
| 468,382 | Beck | Feb. 9, 1892 |
| 2,244,857 | Sletten | June 10, 1941 |
| 2,328,121 | Bartek | Aug. 31, 1943 |
| 2,371,076 | Stevens | Mar. 6, 1945 |